UNITED STATES PATENT OFFICE.

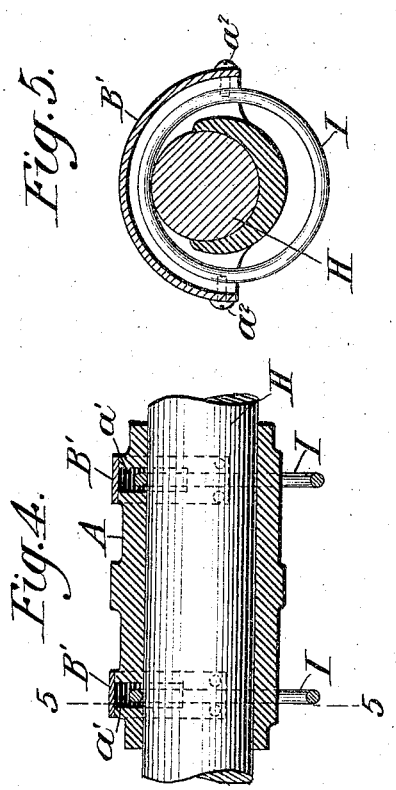
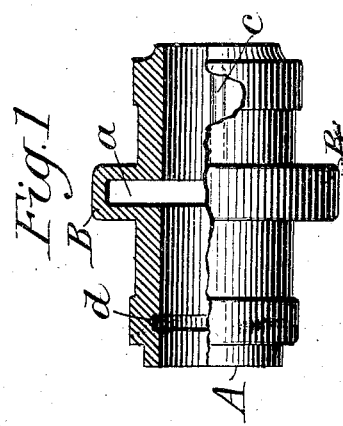
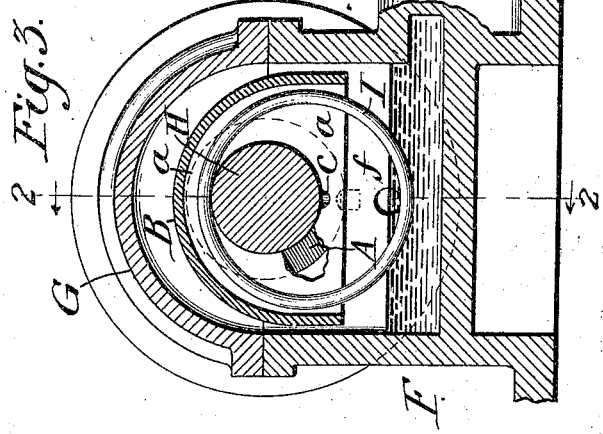
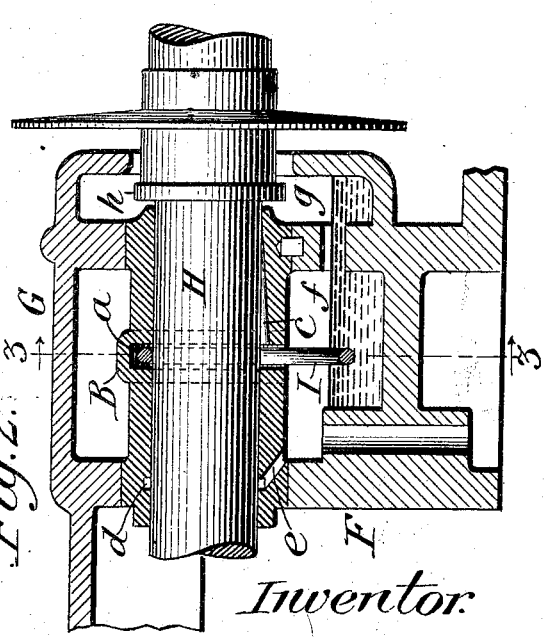

NIELS A. CHRISTENSEN, OF MILWAUKEE, WISCONSIN.

LUBRICATING-BEARING.

No. 841,122.   Specification of Letters Patent.   Patented Jan. 15, 1907.

Original application filed May 16, 1900, Serial No. 16,878. Divided and this application filed September 26, 1905. Serial No. 280,135.

*To all whom it may concern:*

Be it known that I, NIELS A. CHRISTENSEN, a subject of the King of Denmark, residing at Milwaukee, in the county of Milwaukee and State of Wisconsin, have invented certain new and useful Improvements in Lubricating-Bearings, of which the following is a specification.

My invention relates to that class of lubricating-bearings in which a ring loosely suspended from the journal dips into a well or receptacle below it and carries the lubricant up therefrom to the surfaces to be lubricated. Heretofore it has been the practice in the construction of this class of bearings to form a transverse slot or opening for the lubricating-ring through the upper part of the journal-box when made in one piece and to leave said ring exposed at such point or points that the oil thrown centrifugally therefrom would be thrown against the wall of the outer inclosing housing and find its way through said housing to the outside thereof—for instance, through the joint between the two parts of the housing. This has been found to be a source of great trouble and annoyance, particularly in electrical machines, the insulation of which is destroyed or seriously injured by oil. Bearings of this kind are usually provided with closed housings; but unless they are constructed with great care the oil which is forcibly thrown by the lubricating-rings against their inner surfaces will escape through the joints between the parts of the housings and bearings and cause serious trouble.

It is the purpose of my present invention to avoid this trouble by the peculiar construction of the bearing and the arrangement of the lubricating-ring with relation thereto, hereinafter particularly described, and pointed out in the claims.

For the purpose of illustration I have shown my invention as embodied in a bearing designed particularly for the armature-shaft of an electric motor or dynamo; but I do not wish to be understood as limiting myself to this particular application of the invention, as it may be used with advantage for other purposes.

In the accompanying drawings like letters designate the same parts in the several figures.

Figure 1 is a partial plan view and partial longitudinal section of a journal-box embodying my invention. Fig. 2 is a vertical longitudinal section, on the line 2 2, Fig. 3, of the journal-box in connection with an inclosing housing, a journal, and a lubricating-ring. Fig. 3 is a transverse vertical section on the line 3 3, Fig. 2. Fig. 4 is a vertical longitudinal section through a modified form of journal-box, and Fig. 5 a transverse vertical section through the same.

A is a journal-box, which is generally of cylindrical shape and is formed inside about midway between its ends with a transverse recess $a$, closed at the top and sides and open at the bottom. The closure over the upper part of this recess forms a shield B, which connects the otherwise severed parts of the box. One part of the box is also preferably formed on the under side with an internal longitudinal groove $c$, which gradually increases in depth from its end at or near the end of the box toward the middle of the box, where it opens into the transverse recess $a$. The other part of the box is preferably formed inside at or near its outer end with a circumferential groove $d$ and an intersecting opening or passage $e$ through the under side of the box.

F is a recessed box-support, in which the ends of the box A are fitted. It is formed below the box with an oil-well or receptacle $f$ and is provided with a detachable recessed cap G, fitted over the ends of the box A and forming, with the box-support F, a closed housing around the box.

H represents a journal fitted in the box A, and I is a lubricating-ring passing loosely through the recess $a$ below the shield B, which covers the upper part of it, and over the journal H, from which it hangs into the oil-well $f$.

When the journal H revolves, the ring I turns with it and carries a limited supply of oil from the well $f$ to the upper part of said journal, from which it is distributed to the bearing-faces of the box A, the surplus oil flowing toward one end of the box being trapped in the groove $c$ and returned through the opening in the bottom of the recess $a$ to the oil-well $f$ and the surplus oil flowing toward the other end of the box being caught in the groove $d$ and drained back into the well $f$ through the opening or passage $e$. Any oil which may escape from that end of the box in which the groove $c$ is formed is intercepted by a ring or shoulder $h$ on the armature-shaft and thrown by centrifugal force into a chamber $g$, which is formed in the housing, and from which it flows through an opening back into the well $f$.

The upper part of the ring I being covered and inclosed in the recess $a$ by the shield B, any oil thrown from said ring by centrifugal force will be caught by said shield and will run back through the opening in the bottom into the oil-well. The ring is thus prevented when it is turned rapidly from throwing oil against the inner walls of the housing, and oil is thus prevented from working out through the joint between the body F and cap G of the housing. Except for the purpose of holding the box A in place and excluding dust and dirt from the bearing the cap G might be dispensed with since with my improved bearing it is not needed to catch oil thrown off by the lubricating-ring I.

In the modified form of box shown in Figs. 4 and 5 I have illustrated the journal-box A as formed with two transverse recesses $a'$, one near each end, so as to receive two oil-distributing rings I, one to each recess. In the first form the ring I is placed in position from the bottom of the journal-box, while in the second form the rings are placed in position from the top of the box, and to permit that to be done the shields B' are made separate instead of integral with the walls of the grooves and are secured in place by screws $a^2$ or otherwise. In both forms, however, it will be observed that the shield or shields extend down both sides of the journal-box far enough to prevent the oil which is thrown centrifugally from the distributing ring or rings in the rapid rotation of the shaft H from striking the wall of the housing at or above the joint therein, and if this were permitted it would cause leakage or escape of oil at the joint, which it is the purpose of this invention to prevent.

In Fig. 2 of the drawings, the journal-box is shown supported at both ends in the housing; but this is not essential, as it may be supported centrally under the form of box indicated in Fig. 4, or centrally as well as at the ends, as will be apparent to the skilled in the art. In applying my improvement to other kinds of bearings the oil-intercepting grooves $c$ and $d$ may be differently arranged or altogether omitted but for armature-bearings the construction shown in the drawings is desirable. The lubricating or oil-distributing ring or rings I may be composed of sections linked together or of an endless chain or chains.

This application is filed as a continuation of my pending application, filed May 16, 1900, Serial No. 16,878.

Having described my invention and set forth its merits, what I claim is—

1. In a lubricating-bearing the combination of a housing formed in the lower part with an oil-well and provided with a removable cap, a longitudinally-undivided one-part journal-box supported in said housing above said oil-well and formed with a transverse recess which is closed at the top and sides and opens into the bore of the box above the journal and downwardly at the ends into said well, and a ring passing loosely through said recess over the journal in said box and suspended therefrom in said well, substantially as described.

2. In a lubricating-bearing the combination of a housing formed with an oil-well, a longitudinally-undivided one-part journal-box supported at the ends in said housing above said oil-well and formed inside with a transverse recess which is closed at the top and sides and opens below through the box into said well, and a ring passing loosely through said recess over the journal in said box and suspended therefrom in said oil-well, substantially as and for the purposes set forth.

3. In a lubricating-bearing the combination of a housing formed in the under side with an oil-well, a longitudinally-undivided one-part journal-box fitted and supported at the ends in said housing and formed inside about midway between its ends with a transverse recess which is closed at the top and sides by a shield and opens on the underside into said well, said shield connecting the two otherwise transversely-severed parts of the box, one part of said box being formed in the under side with a longitudinal groove leading into said transverse recess, and a ring passing loosely through said recess over the journal in said box and hanging therefrom below the bottom of the box and into said oil-well, substantially as and for the purposes set forth.

4. In a lubricating-bearing the combination with a housing formed with an oil-well and provided with a removable cap, of a longitudinally-undivided one-part journal-box removably supported in said housing above said oil-well and formed with a transverse recess opening into the bore of the box and at its ends into said oil-well, a shield closing the top of said recess and terminating below the junction between the oil-well and its cap, the inner face of the bottom portion of said box being formed with a longitudinally-extending groove opening into the oil-well, and a ring passing loosely through said recess over the journal in said box and suspended therefrom in said oil-well, substantially as described.

5. In a lubricating-bearing the combination with a housing formed with an oil-well and provided with a removable cap, of a longitudinally-undivided one-part journal-box removably supported in said housing above said oil-well and formed with a transverse recess opening into the bore of the box and at its ends into said oil-well, a shield closing the top of said recess and terminating below the junction between the oil-well and its cap, said box being formed with a circumferential groove in its inner face near one end and opening into the oil-well, and a ring passing loosely through said recess over the journal in said box and suspended therefrom in said oil-well, substantially as described.

In testimony whereof I affix my signature in presence of two witnesses.

NIELS A. CHRISTENSEN.

Witnesses:
 JNO. DADMUN,
 CHAS. L. GOSS.